United States Patent [19]

Kosuge

[11] Patent Number: 5,353,176
[45] Date of Patent: Oct. 4, 1994

[54] METHOD OF REPRODUCING MAGNETIC RECORDING DATA AND A MAGNETIC STORAGE SYSTEM USING SWITCHING BETWEEN PLURAL HEADS PROVIDED TO A TRACK

[75] Inventor: Minoru Kosuge, Odawara, Japan

[73] Assignee: Hitachi, Ltd., Tokyo, Japan

[21] Appl. No.: 986,013

[22] Filed: Dec. 4, 1992

[30] Foreign Application Priority Data

Dec. 9, 1991 [JP] Japan .................. 3-324179

[51] Int. Cl.$^5$ .......................... G11B 15/12; G11B 5/09
[52] U.S. Cl. .......................................... 360/63; 360/53
[58] Field of Search ..................... 360/61, 65, 40, 43, 360/45, 10.2, 14.1, 71, 32, 74.3, 70, 64, 51, 31, 53, 63, 121, 38.1

[56] References Cited

U.S. PATENT DOCUMENTS

| | | | |
|---|---|---|---|
| 4,630,146 | 12/1986 | Takayama et al. | 360/10.2 X |
| 4,851,934 | 7/1989 | Takguchi et al. | 360/64 |
| 4,905,093 | 2/1990 | Satoh | 360/61 X |
| 4,991,031 | 2/1991 | Takayama et al. | 360/10.2 |
| 5,142,420 | 8/1992 | Tanaka et al. | 360/32 |
| 5,241,434 | 8/1993 | Okamoto et al. | 360/74.3 X |
| 5,245,482 | 9/1993 | Sagawa et al. | 360/38.1 |
| 5,245,485 | 9/1993 | Dunn et al. | 360/71 X |

Primary Examiner—John Shepperd
Assistant Examiner—Patrick Wamsley
Attorney, Agent, or Firm—Antonelli, Terry, Stout & Kraus

[57] ABSTRACT

In a magnetic storage system including a data conversion unit for performing reading or writing of data from or to a magnetic tape medium, and a system control unit, the data conversion unit has a plurality of electromagnetic transducers which are arranged so as not to overlap with one another in a travel direction of each of a plurality of recording tracks provided on the magnetic tape medium, and performs the reproduction of the data from each reproducing track using one of the electromagnetic transducers a plurality of which are assigned every recording track. In the system control unit, an error included in the regenerative data is detected. When an error is detected, the one electromagnetic transducer which performed the reproduction when detecting an error of the data is switched to another electromagnetic transducer assigned every recording track, thereby to perform the reproduction properly.

20 Claims, 4 Drawing Sheets

METHOD OF REPRODUCING MAGNETIC RECORDING DATA AND A MAGNETIC STORAGE SYSTEM USING SWITCHING BETWEEN PLURAL HEADS PROVIDED TO A TRACK

BACKGROUND OF THE INVENTION

The present invention relates to a method of reproducing magnetic recording data with a magnetic tape as a recording medium and a magnetic storage system employing the same, and more particularly to a technology of reproducing recording data from a magnetic recording medium having wide recording tracks, in which data are stored in accordance with the different track format standards, using a magnetic storage system which is developed in correspondence to a certain track format standard.

In the prior art magnetic storage media such as a magnetic disc unit and a magnetic tape unit, a width of a recording track by a magnetic head is substantially equal to a width of a regenerative track by a reproducing head. However, the increase of a capacity of the magnetic storage, in particular, the magnetic tape unit provides a situation in which a plurality of regenerative tracks are made to correspond to one recording track.

That is, the information recording format (track format) of a magnetic tape cartridge for information exchange is standardized in JIS (Japanese Industrial Standard) ×6124 (enacted on Sep. 1, 1990) in such a way that a width of a magnetic tape is 12.7 mm, eighteen magnetic tracks are included, data density is 1491 cpmm, and a width of each recording track is 0.540 mm. On the other hand, according to the American National Standard ×3B/91-305, the information recording format is standardized in such a way that a width of a magnetic tape is 12.65 mm, thirty six recording tracks are included, data density is 1491 cpmm, and a width of each recording track is 0.285 mm.

If data which was stored in two kinds of magnetic tapes in accordance with those different information recording formats (track formats) is intended to be reproduced using one magnetic tape unit, it is necessary to employ a reproducing head having electromagnetic transducers the number of which corresponds to at least thirty six tracks. With respect to the relationship between the electromagnetic transducers of that reproducing head and the recording tracks on the magnetic tape on which data was recorded in conformity to JIS ×6124, since two electromagnetic transducers are assigned to one recording track, two reproducing tracks are made to correspond to one recording track.

SUMMARY OF THE INVENTION

It is therefore one object of the present invention to provide a method of reproducing magnetic recording data by which data, which were recorded in a plurality of kinds of magnetic recording media having recording tracks different in width from one another, can be reproduced by the same reproducing head.

It is another object of the present invention to provide a method of reproducing magnetic recording data which is capable of preventing regenerative errors from occurring continuously when data, which were recorded in a recording track wider than a track of each electromagnetic transducer of a reproducing head, are reproduced.

It is still another object of the present invention to provide a magnetic storage system which is capable of reproducing data properly, which were recorded in a recording track wider than a track of each electromagnetic transducer of a reproducing head, without occurrence of an error.

In the case where data recorded on the magnetic tape having the above-mentioned 18-track format are reproduced by the reproducing head having the thirty six electromagnetic transducers, there are considered two methods, i.e., a method of reproducing data using all of the thirty six electromagnetic transducers simultaneously, and a method in which a set of reproducing heads are formed on the basis of one electromagnetic transducer out of two electromagnetic transducers, which are assigned to each of the recording tracks having the 18-track format, and the reproduction is performed using the set of reproducing heads. In the standard of the above-mentioned 18-track format, predetermined dispersion is allowed in a track position. Therefore, the electromagnetic transducer assigned to each recording track may project from the associated recording track. This is referred to as "off-track". If the electromagnetic transducer of the reproducing head is off-tracked from the proper position of the recording track, a part of the magnetic tape on which no data were recorded is subjected to the playback operation. Therefore, the amplitude of the regenerative signal is decreased. Alternatively, since a part of the data which was not erased was read out, this causes noise to occur. Moreover, when a defect is included in the recording medium which is tracked by the electro-magnetic transducer of the reproducing head, this causes noise to occur in the same manner as in the off-track. Thus, the off-track of the reproducing head or the defect of the recording medium causes the regenerative error to occur, and further this may make the reading of the data impossible. The off-track is due to the difference between the position of the recording head when the data was recorded on the magnetic tape and the position of the reproducing head to the magnetic tape when performing the reproduction. Thus, since the off-track occurs in a fixed manner, even if the retry for the reproduction is performed, it is difficult to prevent the off-track from occurring. The present invention was made in order to prevent such a regenerative error from occurring.

According to a magnetic tape apparatus to which the present invention is applied, the proper reproduction can be performed in either a magnetic tape cartridge by the 18-track format or a magnetic tape cartridge by the 36-track format.

According to one feature of the present invention, when data, which were recorded in a recording track wider than a track of each electromagnetic transducer of a reproducing head, are intended to be reproduced, a plurality of reproducing heads having electromagnetic transducers, which are arranged so as not to overlap with one another in a travel direction of each recording track, are made to correspond to each recording track, and the reproducing head which is not off-tracked out of the plurality of reproducing heads is used to reproduce the data.

More specifically, a magnetic storage according to one aspect of the present invention includes:

data reproducing means including a plurality of reproducing heads having electromagnetic transducers arranged so as not to overlap with one another in a travel direction of each of a plurality of recording tracks provided on a magnetic tape medium, the data reproducing means serving to reproduce data from the individual recording tracks using one of the electromagnetic transducers, a plurality of electromagnetic transducers being assigned to each of the recording tracks;

means for detecting an error of the regenerative data; and switching means for switching the one electromagnetic transducer performing the reproduction when detecting an error of the data to another electromagnetic transducer assigned to each of the recording tracks to perform the reproduction.

Moreover, a magnetic storage system according to another aspect of the present invention includes:

a data conversion unit for performing recording or reproduction of data, with respect to each of a plurality of recording tracks provided on a magnetic tape medium, by electromagnetic conversion means; and a system control unit for controlling the data conversion unit on the basis of a command issued from a host unit so as to record data sent from the host unit in the magnetic tape medium and to send data read out from the magnetic tape medium to the host unit.

The data conversion unit includes: medium driving means for driving the magnetic tape medium; a plurality of reproducing heads having electromagnetic transducers arranged so as not to overlap with one another in a travel direction of each of a plurality of recording tracks provided on the magnetic tape medium; head switching means for switching the plurality of reproducing heads so as to perform reproduction of the data from each of the recording tracks by one of the electromagnetic transducers, a plurality of electromagnetic transducers being assigned to each of the recording tracks; and data conversion control means for controlling the head switching means and the medium driving means.

Moreover, the system control unit includes: error detecting means for detecting an error of data reproduced by the data conversion unit; and data control means, connected to the host unit, the data conversion control means and the error detecting means, for controlling data between the host unit and the data conversion unit.

The data control means serves to instruct the data conversion means to switch the present reproducing head to another reproducing head on the basis of a report of occurrence of an error of an regenerative data as sent from the error detecting means to the data control means. The data conversion unit serves to perform the reproduction of the data by the reproducing head to which the former reproducing head was switched in accordance with the switching command issued from the data control means.

Incidentally, when by receiving a command for reading data issued from the host unit, the system control unit instructs the data conversion unit to reproduces the data, the data conversion unit reproduces the data using the reproducing head which has already been specified by the system control unit. Then, an error of the data, which has been transferred from the data conversion unit, is detected by the system control unit. If the data includes no error, the data of interest is transferred to the host unit. If the data includes an error, retry is repeated by predetermined times. In the case where even if the retry is repeated by the predetermined times, a regenerative error of the data occurs, the system control unit instructs the data conversion unit to switch the present reproducing head to another reproducing head and to reread the data. Then, the data conversion unit switches the present reproducing head to another reproducing head and also reproduces the data using the another reproducing head to transfer the regenerative data to the system control unit. The system control unit detects an error of the data transferred thereto. If the data includes an error, the system control unit carries out predetermined times of retries. In the case where even if the predetermined times of retries are completed, the data cannot be reproduced properly, the system control unit reports the data as the regenerative error to the host unit. If the data can be reproduced properly, the data of interest is transferred to the host unit. Incidentally, the magnetic tape medium can be subjected to the playback operation in either a forward direction or a reverse direction, and therefore, the above-mentioned retry may be performed in either a forward direction or a reverse direction.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein.

DESCRIPTION OF THE PREFERRED EMBODIMENTS

The preferred embodiments of the present invention will hereinafter be described in detail with reference to the accompanying drawings.

Figure 1:
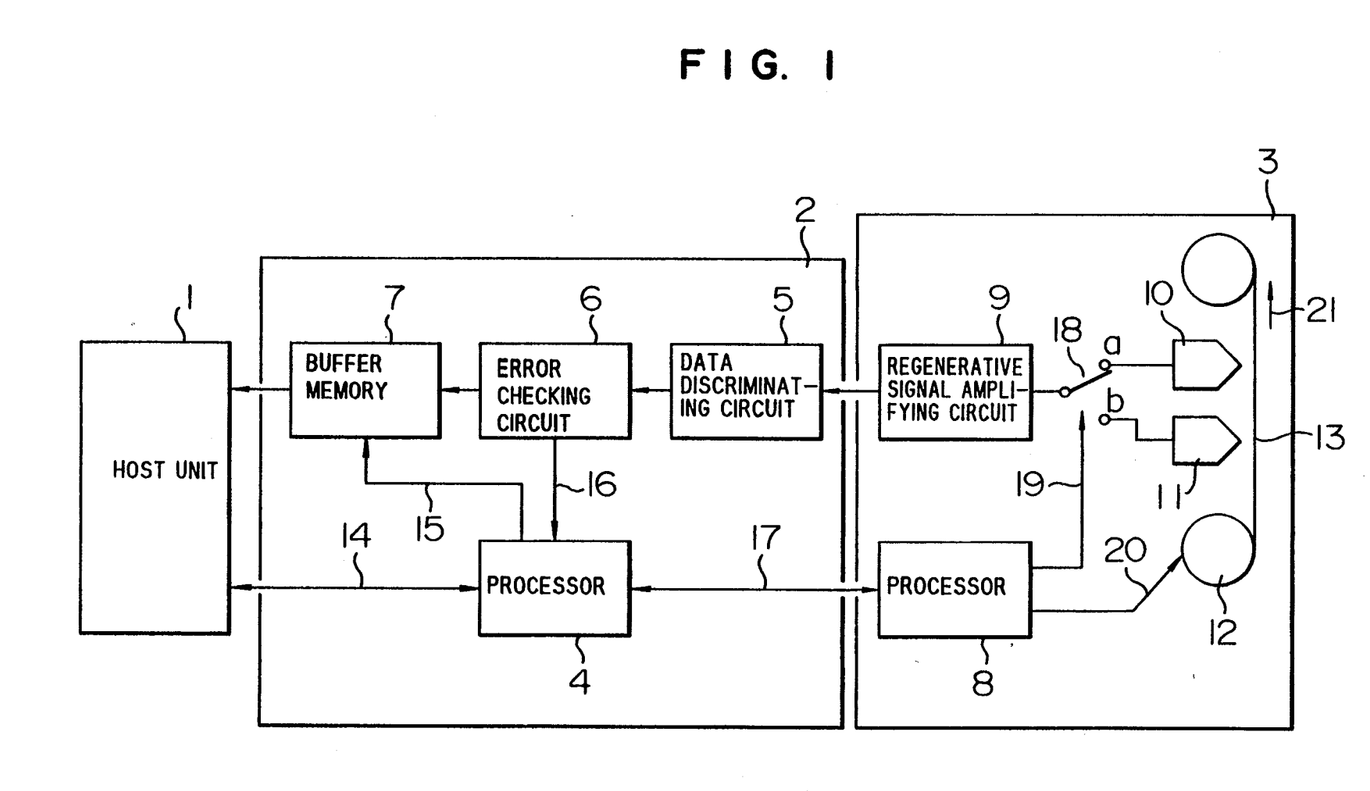
FIG. 1 is a block diagram showing a configuration of one embodiment of a magnetic storage system according to the present invention.

FIG. 1 is a block diagram showing a configuration of one embodiment of a magnetic storage system according to the present invention. The magnetic storage system of the present embodiment includes a data conversion unit 3 for performing reading or writing of data from or to a magnetic tape medium 13, and a system control unit 2. The system control unit 2 serves to control the giving or receiving of a command to or from a host unit 1, the giving or receiving of data to or from the data conversion unit 3, and the giving or receiving of data to or from the host unit 1. The data conversion unit 3 serves to perform the electromagnetic conversion of the data in order to record or reproduce the data in or from a magnetic tape medium 13.

The magnetic tape medium 13 travels in a direction indicated by an arrow 21 by a motor 12. In a travel path of the magnetic tape medium 13, a plurality of reproducing heads 10 and 11 are arranged in order to read out the data recorded on the magnetic tape medium 13. The data, which was recorded on the magnetic tape medium 13, is read out by the plurality of reproducing heads 10 and 11, and a regenerative signal which has been obtained through the reading operation by one of the reproducing heads is inputted through a switch 18 to a circuit 9 for amplifying a regenerative or reproduced signal. The regenerative or reproduced signal amplifying circuit 9 amplifies the signal which has been obtained through the reading operation to be inputted thereto, and then sends the amplified signal to the system control unit 2. The operation of the switch 18 and the motor 12 is controlled through lines 19 and 20 by a processor (data conversion control means) 8 for controlling the electromagnetic conversion of data.

The system control unit 2 has the function of checking an error of the signal which has been sent from the data conversion unit 3 to transfer the data which has been read out properly to the host unit 1. The signal, which has been sent from the data conversion unit 3, is first inputted to a circuit 5 for discriminating data which performs the discrimination of the data. The system control circuit 2 includes, in addition to the data discriminating circuit 5, a circuit 6 for checking an error of data, a buffer memory 7 and a processor (data control means) 4 for controlling those units. The processor 4 is connected to the error checking circuit 6 and the buffer memory 7 through lines 16 and 15. Moreover, the processor 4 serves to control the processor 8 provided in the data conversion unit 3 through a line 17, and also perform the giving or receiving of a command to or from the host unit 1 through a line 14.

Figure 2:
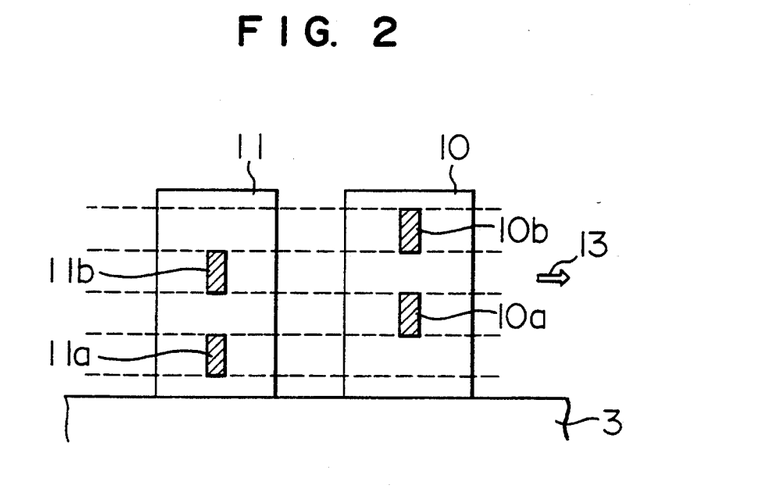
FIG. 2 is a schematic diagram useful in explaining one example of the positional relationship between electromagnetic transducers in a plurality of reproducing heads.
Figure 3A:
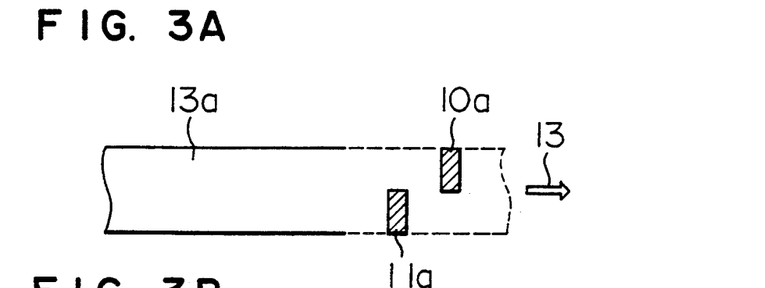
FIGS. 3A, 3B and 3C are diagrams each showing one example of the positional relationship between a recording track and a plurality of electromagnetic transducers in the reproducing heads.
Figure 3B:
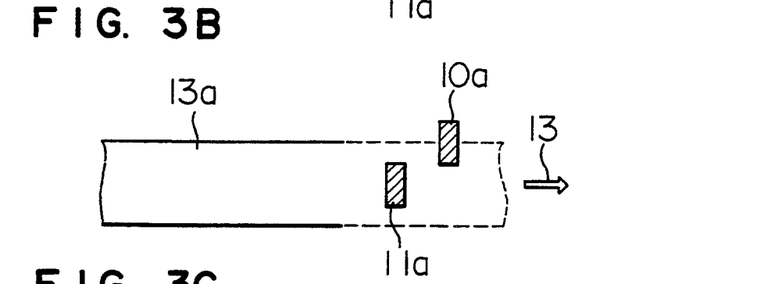
Figure 3C:
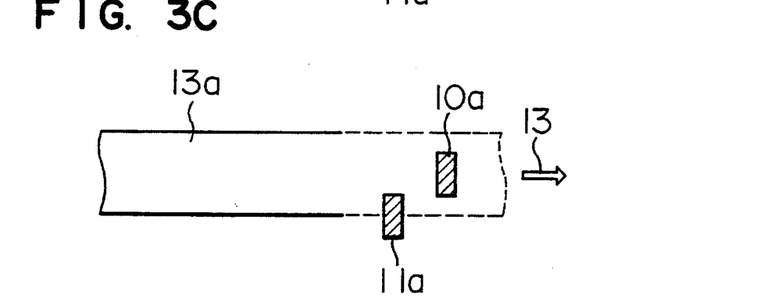

FIG. 2 shows one example of an arrangement of the reproducing heads 10 and 11 in the data conversion unit 3. The reproducing head 10 has a plurality of electromagnetic transducers 10a, 10b, ..., and the reproducing head 11 has a plurality of electromagnetic transducers 11a, 11b, .... The electromagnetic transducers 10a, 10b, ... constituting the reproducing head 10 and the electromagnetic transducers 11a, 11b, ... constituting the reproducing head 11 are arranged so as not to overlap with one another when viewed from the travel direction of the magnetic tape medium 13 (i.e., when viewed from the right and left directions in FIG. 2). Therefore, with respect to a plurality of recording tracks (e.g., the 36-track format as shown by a dotted line in FIG. 2) which were recorded on the magnetic tape medium by a recording head including the plural electromagnetic transducers each of which has substantially the same track width as that of each of the electromagnetic transducers 10a, 10b, ..., 11a, 11b, ..., the data reproduction can be performed by making the electromagnetic transducers 10a, 10b, ..., 11a, 11b, ... correspond to the associated recording tracks. Moreover, as shown in FIGS. 3A to 3C, with respect to the magnetic tape medium in which a recording track (e.g., a recording track by the 18-track format) 13a is recorded which is wider than the track of each of the electromagnetic transducers 10a, 10b, ..., 11a, 11b, ..., the adjacent two electromagnetic transducers of the reproducing heads 10 and 11 are made to correspond to each other in such a way that the two electromagnetic transducers 10a and 11a are assigned to the first recording track 13a, the two electromagnetic transducers 10b and 11b are assigned to a second recording track 13a, ....

The description will hereinbelow be given to one example of the operation of the magnetic storage system according to the present embodiment. In FIG. 1, the host unit 1 issues a command for reading out data to the magnetic storage system including the system control unit 2 and the data conversion unit 3. The command thus issued is received through the line 14 by the processor 4 in the system control unit 2 which instructs through the line 17 the processor 8 in the data conversion unit 3 to reproduce the data. The processor 8 actuates the motor 12 through the line 20 thereby to move the magnetic tape medium 13 in a travel direction indicated by the arrow 21. In this case, the description will be given with respect to the playback of the magnetic tape medium 13 in which the wide recording track (e.g., the recording track by the 18-track format) 13a is recorded. When the switch 18 is being connected to a terminal a, the regenerative signal which has been read out by the reproducing head 10 is sent to the regenerative signal amplifying circuit 9, and then the amplified regenerative signal is sent to the system control unit 2.

In the system control unit 2, the data is discriminated by the data discriminating circuit 5. The data thus discriminated is sent to the error checking circuit 6 which judges whether or not the data is correct. Since a CRC code (cycle redundancy check code) is added to the recording data, the recording data can be properly checked by the error checking circuit 6. The result of the judgement is reported to the processor 4 through the line 16. If so, the processor 4 instructs through the line 15 the buffer memory 7 to store the regenerative data and to transfer the data to the host unit 1. If not, the processor 4 instructs through the line 17 the processor 8 to return the magnetic tape medium 13 to the original position. Then, the processor 8 actuates through the line 20 the motor 12 in such a way that the magnetic tape medium 13 is moved in a direction opposite to that indicated by the arrow 21 to be returned to the original position. Thereafter, the processor 4 repeats the above-mentioned control by predetermined times until the data has been reproduced properly within the predetermined times.

In the case where even if the processor 4 repeats the above-mentioned control by the predetermined times, the data cannot be reproduced properly, the processor 4 instructs the processor 8 to switch the present reproducing head (the reproducing head 10) to the other reproducing head (the reproducing head 11). Then, the processor 8 connects through the line 19 the switch 18 to the terminal b. As a result, such a state is provided that the reproducing head 11 can reproduce the data. Thereafter, the processor 4 instructs the processor 8 to reproduce the data. The processor 8 moves the magnetic tape medium 18 in the same manner as in the above-mentioned operation, so that the data is reproduced by the reproducing head 11, and the regenerative signal is amplified by the regenerative signal amplifying circuit 9. Then, the data is discriminated by the data discriminating circuit 5, and the error checking circuit 6 judges whether or not the data is correct. The subsequent operation is the same as that as described above. However, when the data cannot be finally reproduced properly, the processor 4 reports the error to the host unit 1 through the line 14.

Moreover, when the error checking circuit 6 judges that the data includes an error, alternatively, the magnetic tape medium 13 is moved in the reverse travel direction to perform the reproduction. The processor 4 instructs through the line 17 the processor 8 to move the magnetic tape medium 13 in the reverse travel direction and to reproduce the data. Then, the processor 8 actuates through the line 20 the motor 12 so as to move the magnetic tape medium in a direction opposite to that of the arrow 21. Thereafter, the processor 4 repeats the above-mentioned control by predetermined times until the data can be reproduced properly within the predetermined times. In the case where even if the processor 4 repeats the above-mentioned control by predetermined times, the data cannot be repeated properly, the processor 4 instructs the processor 8 to switch the present reproducing head to another reproducing head. The subsequent operation is the same as the above-mentioned operation. When the processor 4 instructs the processor 8 to move the magnetic tape medium in the reverse travel direction, the switching of the present reproducing head to another reproducing head may be instructed simultaneously.

In the case where a plurality of wide recording tracks 13a are recorded on the magnetic tape medium, the positional relationship between the adjacent two electromagnetic transducers 10a and 11a of the reproducing heads 10 and 11 corresponding to a certain wide recording track 13a is shown by one of the relationships of FIGS. 3(a), 3(b) and 3(c). In the case of FIG. 3(a), both the electromagnetic transducers 10a(10b) and 11a(11b) of the reproducing heads 10 and 11 are located within the recording track 13a, and thus, the reproduction can be performed using either the reproducing head 10 or 11. In the case of FIG. 3(b), since the electromagnetic transducer 10a(10b) of the reproducing head 10 projects from the recording track 13a, there is the high possibility that the data cannot be reproduced by the reproducing head 10. However, since the electromagnetic transducer 11a(11b) of the reproducing head 11 is located within the recording track 13a, the data can be reproduced properly by the reproducing head 11. In the case of FIG. 3(c), conversely, the data can be reproduced properly by the reproducing head 10 including the plurality of electromagnetic transducers 10a, 10b, . . . . Thus, by switching the reproducing heads 10 and 11 to each other, the data can be reproduced properly even from the magnetic tape media having the recording tracks different in width from each other. Therefore, a plurality of kinds of magnetic tape media the recording tracks of which are different in width from one another can be reproduced using the same magnetic storage. According to the magnetic tape apparatus to which the present invention is applied, with respect to either the magnetic tape cartridge by the 18-track format or the magnetic tape cartridge by the 36-track format, the data can be reproduced properly.

Figure 4:
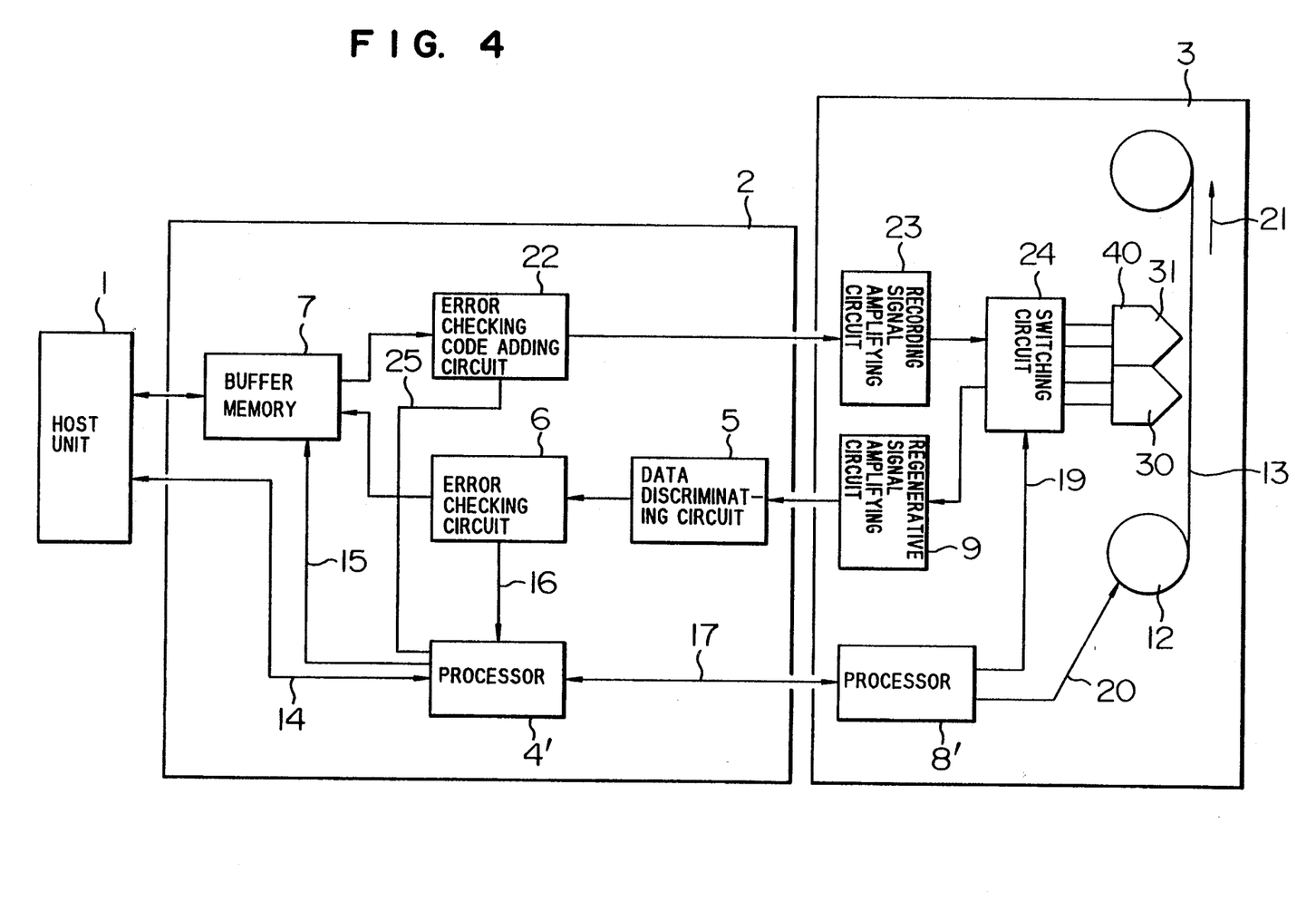
FIG. 4 is a block diagram showing a configuration of another embodiment of the magnetic storage system according to the present invention.

FIG. 4 is a block diagram showing a configuration of another embodiment of the magnetic storage system according to the present invention. In the same manner as in the above-mentioned embodiment, the magnetic storage system of the present embodiment includes the data conversion unit 3 for performing reading or writing of data from or to the magnetic tape medium 13, and the system control unit 2. In the travel path of the magnetic tape medium 13, a magnetic head 40 having electromagnetic conversion units 30 and 31 each of which includes a plurality of electromagnetic transducers is arranged in order to record or reproduce the data on or from the magnetic tape medium 13.

Figure 5A:
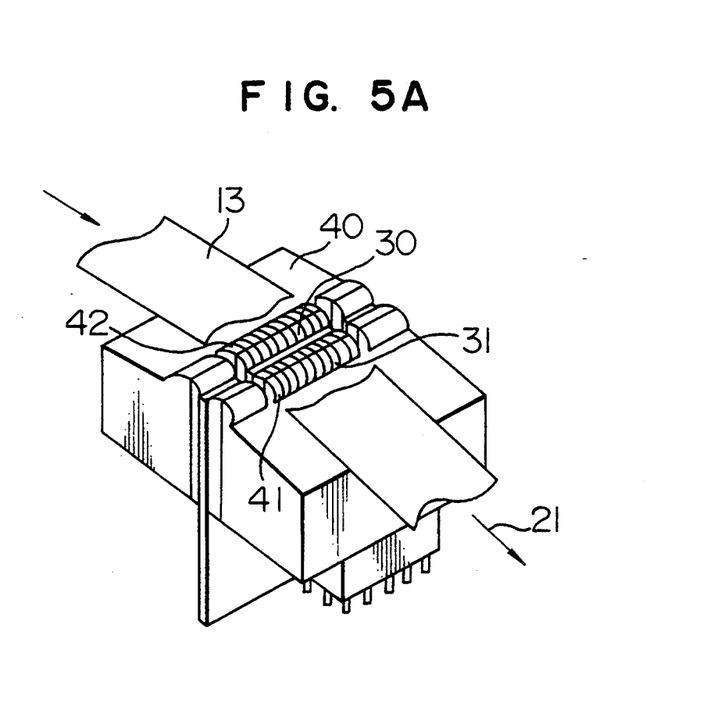
FIGS. 5A and 5B are views useful in explaining a magnetic head employed in the embodiment shown in FIG. 4.
Figure 5B:
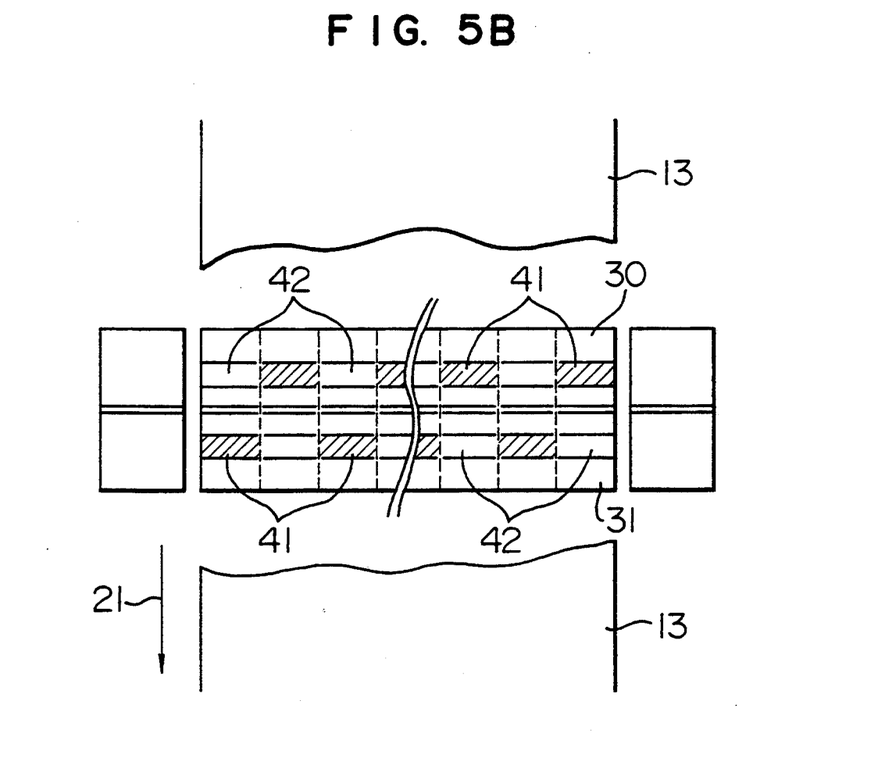

FIGS. 5A and 5B show the magnetic head for performing recording or reproduction of the data in the present embodiment. FIG. 5A is a perspective view showing the relationship between the magnetic head 40 employed in the present embodiment and the magnetic tape medium 13. FIG. 5B is a plan view when viewed from the side of the magnetic tape medium confronting the electromagnetic conversion units.

As shown in FIG. 5A, the electromagnetic unit 30 or 31 of the magnetic head 40 is constructed in such a way that a reproducing electromagnetic transducer 41 and a recording electromagnetic transducer 42 are arranged alternately in a line. More specifically, as shown in FIG. 5B, the reproducing electromagnetic transducer 41 and the recording electromagnetic transducer 42 are disposed alternately in a line. At least the reproducing electromagnetic transducers 41 are disposed in the electromagnetic conversion units 30 and 31 so as not to overlap in position with one another with respect to the travel direction of the magnetic tape medium 13.

A width of each electromagnetic transducer is, normally, substantially equal to the width of the recording track. However, in the case where a magnetic tape which has a recording track wider than the electromagnetic transducer is subjected to the playback operation, a plurality of electromagnetic transducers are provided so as to correspond to one recording track. For example, in the case where the tape having the 18-track format is subjected to the playback operation using the magnetic tape apparatus having the 36-track format, two electromagnetic transducers are arranged so as to correspond to one recording track. In the magnetic head according to the present embodiment, the two reproducing electromagnetic transducers 41 corresponding to one recording track are arranged so as to be distributed to the electromagnetic conversion units 30 and 31 of the magnetic head 40. With the above-mentioned arrangement, in the magnetic head 40 of the present embodiment, if the electromagnetic conversion units 30 and 31 are switched to each other, the reproducing electromagnetic transducers 41 corresponding to the same recording track can be switched to each other.

The operation of the reproduction of the data is substantially the same as in the above-mentioned embodiment. Now, the operation will hereinbelow be described with respect to the magnetic head 40 for reading out the data from the magnetic tape medium 13.

The data which was recorded on the magnetic tape medium 13 is read out by the predetermined magnetic conversion unit 30 or 31 of the magnetic head 40. At this time, instead of the predetermined electromagnetic conversion unit, the electromagnetic conversion unit which succeeded in reading of the data in the former reproduction may be used. In this case, in accordance with the command issued from a processor 8', a switching circuit 24 does not perform the switching of one electromagnetic conversion unit to the other electromagnetic conversion unit.

The reproduced data signal is amplified by the regenerative signal amplifying circuit 9 and then is sent to the system control unit 2. The system control unit 2 checks whether or not the signal sent from the data conversion unit 3 includes an error (by the error checking circuit 6) and then transfers the data which was read out properly to the host unit 1. If the reproduced data signal includes an error, the regenerative retry is repeated by a predetermined number of times, and then the switching circuit 24 is actuated so that the reproduction of the data is performed by the electromagnetic conversion unit which did not perform the reproduction. Alternatively, the reproduction in the reverse direction of the magnetic tape medium is performed.

Next, the description will hereinbelow be given to the case where the data is recorded.

A command for instructing the recording of the data is issued from the host unit 1 to the processor 4', and also the data is temporarily stored in the buffer memory 7. The data stored in the buffer memory 7 is sent from a circuit 22 for adding an error check code to a circuit 23 for amplifying a recording signal. In this connection, when the data is being passed through the error check code adding circuit 22, an error check code is added to the data. The recording signal amplifying circuit 23 amplifies the data signal and then sends the data signal thus amplified to the magnetic head 40 through the switching circuit 24. In the case of the recording of the data, the data signal is transmitted to both the electromagnetic conversion units of the magnetic head 40 through the switching circuit 29. A processor 4' instructs the processor 8' of the data conversion unit 3 to write the data to the magnetic tape medium 13. Then, the processor 8' instructs the switching circuit 24 to select the recording electromagnetic transducer of the magnetic head 40 and also instructs the motor 12 to make the magnetic tape medium 13 travel through the lines 19 and 20.

Therefore, the plurality of kinds of magnetic tape media which have the respective recording tracks different in width from one another can be subjected to the playback operation by the same magnetic storage. Thus, according to the magnetic tape apparatus to which the present invention is applied, with respect to either the magnetic tape cartridge by the 18-track format or the magnetic tape cartridge by the 36-track format, the data can be reproduced properly.

While the present invention that was made by the present inventor has been described in detail on the basis of the preferred embodiments, it is to be understood that the present invention is not limited to the above-mentioned embodiments, and variations may be made by one skilled in the art as fall within the scope of the appended claims without departing from the spirit of the invention.

The effect which is obtained from the typical invention out of the inventions disclosed in the present specification is as follows.

That is, according to the present invention, in the case where the data is reproduced which was recorded in the recording track wider than the track of each electromagnetic transducer in the reproducing head, a plurality of reproducing heads having the electromagnetic transducers, which are arranged so as not to overlap with one another in the travel direction of each recording track, are made to correspond to each recording track, and the reproducing head which is not off-tracked is selected precisely from the plurality of reproducing heads to perform the reproduction. Therefore, it is possible to effectively prevent the regenerative error from occurring.

I claim:

1. A method of reproducing magnetic recording data used for a magnetic recording/reproducing apparatus for performing recording or reproduction with respect to a plurality of recording tracks provided on a magnetic tape medium using electromagnetic transducers, said method comprising the steps of:

reproducing data from one recording track of said recording tracks using a first reproducing electromagnetic transducer of a plurality of reproducing electromagnetic transducers corresponding to said recording track, respective said reproducing electromagnetic transducers being arranged so as not to overlap with one another in a travel direction of each of said recording tracks;

detecting an error of reproduced data from reproduction using said first reproducing electromagnetic transducer; and performing, instead of using said reproduced data from said first reproducing electromagnetic transducer performing reproduction when detecting an error of said data, a retry of reproduction for a same portion of a same said recording track by using a second reproducing electromagnetic transducer corresponding to the same said recording track.

2. A method according to claim 1, wherein after detecting said error, at retry operation including said reproducing and detecting steps is repeated by a predetermined number of times using said first reproducing electromagnetic transducer and then reproduction using said first reproducing electromagnetic transducer is switched to laid second reproducing electromagnetic transducer by electromagnetic transducer switching means for switching from said first electromagnetic transducer to said second electromagnetic transducer.

3. A method according to claim 2, wherein the reproduction after the switching is performed by said second reproducing electromagnetic transducer to which said method is switched by said electromagnetic transducer switching means.

4. A method according to claim 1, wherein said plurality of reproducing electromagnetic transducers corresponding to said recording track are arranged in a plurality of reproducing heads.

5. A method according to claim 4, wherein said step of switching from said first reproducing electromagnetic transducer to said second reproducing electromagnetic transducer is a step of switching from a first reproducing head to a second reproducing head.

6. A method according to claim 4, wherein after detecting said error, a retry operation including said reproducing and detecting steps is repeated by a predetermined number of times using said first reproducing electromagnetic transducer and then reproduction using said first reproducing electromagnetic transducer is switched to said second reproducing electromagnetic transducer by electromagnetic transducer switching means for switching from said first electromagnetic transducer to said second electromagnetic transducer.

7. A method according to claim 6, wherein reproduction after switching is performed by said second reproducing head to which said method is switched by said electromagnetic transducer switching means.

8. A magnetic storage system including a data conversion unit for performing recording or reproduction with respect to a plurality of recording tracks provided on a magnetic tape medium using electromagnetic conversion means, and a system control unit for controlling said data conversion unit on a basis of a command issued from a host unit to record data from said host unit on said magnetic tape medium and to send data read out from said magnetic tape medium to said host unit, said data conversion unit comprising:
a medium driving means for driving said magnetic tape medium;
a plurality of reproducing electromagnetic transducers for reproducing data from said plurality of recording tracks provided on said magnetic tape medium;
a plurality of reproducing heads having said plurality of reproducing electromagnetic transducers arranged so as not to overlap with one another in a travel direction of each of said plurality of recording tracks;
a head switching means for switching from a first reproducing head to a second reproducing head included in said plurality of reproducing heads; and
a data conversion control means for controlling said head switching means and said medium driving means, said system control unit comprising:
an error detecting means for detecting an error of data reproduced by said data conversion unit; and
a data control means, connected to said host unit, said data conversion control means and said error detecting means, for controlling transfer of data between said host unit and said data conversion unit, wherein on a basis of a report of an error occurrence in regenerative data as indicated by said error detecting means to said data control means, said data control means instructs said data conversion control means using a switching command to switch reproduction from said first reproducing head to said second reproducing head and retry reproduction for a same portion of a same recording track on said magnetic tape medium using said second reproducing head, and wherein said data conversion unit then performs reproduction of data using said second reproducing head to which said magnetic storage system is switched by said switching command issued from said data control means.

9. A magnetic storage system according to claim 8, wherein, when performing a next reproduction operation, said data conversion unit selects reproduction using a one of said first reproducing head and said second reproducing head which was selected for a previous reproduction operation by said data control means.

10. A magnetic storage system according to claim 8, wherein in a case where after said first reproducing head is switched to said second reproducing head by said head switching means and data cannot be finally reproduced properly, said data control means reports a permanent error to said host unit.

11. A magnetic storage system according to claim 8, wherein after said first reproducing head is switched to said second reproducing head, if reproduction is performed properly using said second reproducing head, said data conversion unit performs reproduction of data, with respect to a subsequent data reproduction, using said second reproducing head after switching.

12. A magnetic storage system according to claim 8, wherein after detecting said error, a retry operation for reproduction is repeated by a predetermined number of times using said first reproducing head, and then said data conversion unit switches said first reproducing head to said second reproducing head using said head switching means.

13. A magnetic storage system according to claim 12, wherein when a retry command for said retry operation is issued from said data control means, said data conversion control means instructs said medium driving means to rewind said magnetic tape medium and instructs said head switching means to switch reproduction from said first reproducing head to said second reproducing head.

14. A magnetic storage system according to claim 12, wherein when a retry command for said retry operation by a reversing of a travel direction of said medium driving means to perform reproduction is issued from said data control means, said data conversion control means instructs said medium driving means to reverse said travel direction.

15. A magnetic storage system according to claim 14, wherein after detecting said error, said data conversion unit repeats said retry operation by said predetermined number of times and then switches reproduction from said first reproducing head to said second reproducing head using said head switching means.

16. A magnetic storage system according to claim 14, wherein when data can be reproduced properly in a reverse said travel direction, said data control means reports a fact to said host unit that a transfer order of regenerative data is contrary to a transfer order expected by said host unit.

17. A magnetic storage system according to claim 14, wherein a case where after said first reproducing head is switched to said second reproducing head by said head switching means and data cannot be finally reproduced properly, an erroneous data is sent as a permanent error to said host unit.

18. A magnetic storage system according to claim 8, further comprising a data discriminating means for sending, after discriminating said data reproduced by said data conversion unit, said reproduced data to said error detection means.

19. A magnetic storage system according to claim 8, wherein when said data is reproduced properly, said data control means issues a command for transferring said said data to said host unit.

20. A magnetic storage system according to claim 19, wherein said system control unit includes a memory for storing said data to be transferred to said host unit.

* * * * *